(12) United States Patent
Kujime (10) Patent No.: US 9,783,005 B2
(45) Date of Patent: Oct. 10, 2017

(54) PNEUMATIC TIRE

(71) Applicant: Sumitomo Rubber Industries, Ltd., Kobe-shi, Hyogo (JP)

(72) Inventor: Tomoyuki Kujime, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 276 days.

(21) Appl. No.: 14/636,735

(22) Filed: Mar. 3, 2015

(65) Prior Publication Data

US 2015/0258858 A1    Sep. 17, 2015

(30) Foreign Application Priority Data

Mar. 11, 2014  (JP) .................. 2014-047990
Mar. 11, 2014  (JP) .................. 2014-047991

(51) Int. Cl.
*B60C 11/03*  (2006.01)
*B60C 11/04*  (2006.01)
(Continued)

(52) U.S. Cl.
CPC ...... *B60C 11/0304* (2013.01); *B60C 11/0306* (2013.01); *B60C 11/04* (2013.01);
(Continued)

(58) Field of Classification Search
CPC ....... B60C 11/03; B60C 11/04; B60C 11/042; B60C 11/0304; B60C 11/0306;
(Continued)

(56) References Cited

U.S. PATENT DOCUMENTS

| 2005/0076985 A1* | 4/2005 | Colombo ............ B60C 11/0302 152/209.18 |
| 2013/0186532 A1 | 7/2013 | Kujime |
| 2014/0238566 A1* | 8/2014 | Takahashi ........... B60C 11/1236 152/209.8 |

FOREIGN PATENT DOCUMENTS

| EP | 0455925 A1 | 11/1991 |
| EP | 2610082 A2 | 7/2013 |

(Continued)

OTHER PUBLICATIONS

Extended European Search Report dated Oct. 20, 2015, for European Application No. 15156435.8.

*Primary Examiner* — Eric Hug
(74) *Attorney, Agent, or Firm* — Birch, Stewart, Kolasch & Birch, LLP (57) ABSTRACT

A pneumatic tire has a tread portion 2 provided with: an outboard shoulder main groove 4 and an outboard crown main groove 6 extending circumferentially of the tire; first outboard shoulder axial grooves 12a extending from an outboard tread edge Teo to the outboard shoulder main groove 4; second outboard shoulder axial grooves 12b extending from the outboard tread edge Teo and terminating without reaching to the outboard shoulder main groove 4; first outboard middle axial grooves 16 extending from the outboard shoulder main groove 4 and terminating without reaching to the outboard crown main groove 6; and second outboard middle axial groove 22 extending from the outboard crown main groove 6 and terminating without reaching to the outboard shoulder main groove 4. The first outboard middle axial grooves 16 are aligned with the first outboard shoulder axial grooves 12a, respectively, so as to smoothly continue to the first outboard shoulder axial grooves 12a through the outboard shoulder main groove 4.

15 Claims, 8 Drawing Sheets (51) Int. Cl.
*B60C 11/12* (2006.01)
*B60C 11/13* (2006.01)

(52) U.S. Cl.
CPC .............. *B60C 11/12* (2013.01); *B60C 11/13* (2013.01); *B60C 11/1369* (2013.01); *B60C 11/1392* (2013.01); *B60C 2011/0353* (2013.01); *B60C 2011/0358* (2013.01); *B60C 2011/0369* (2013.01); *B60C 2011/0381* (2013.01); *B60C 2011/0386* (2013.01); *B60C 2011/0388* (2013.01)

(58) Field of Classification Search
CPC ........... B60C 11/0309; B60C 2011/039; B60C 2011/0337; B60C 2011/0339; B60C 2011/0341; B60C 2011/0353; B60C 2011/0358; B60C 2011/0381; B60C 2011/0386; B60C 2011/0372; B60C 2011/0383; B60C 2011/0374; B60C 11/12; B60C 11/13
USPC ....... 152/209.1, 209.3, 209.8, 209.9, 209.16, 152/209.18, 900, 901
See application file for complete search history.

(56) References Cited

FOREIGN PATENT DOCUMENTS

| | | |
|---|---|---|
| FR | 2673578 A1 | 9/1992 |
| JP | 2012-218650 A | 11/2012 |
| JP | 2013-151236 A | 8/2013 |
| WO | WO 2015/008137 A1 | 1/2015 |

* cited by examiner

PNEUMATIC TIRE

BACKGROUND OF THE INVENTION

The present invention relates to a pneumatic tire, more particularly to a tread pattern capable of achieving good steering stability and good drainage.

In Japanese Patent Application Publication Nos. 2012-218650A and 2013-151236A, pneumatic tires for four-wheel motorcars are disclosed, wherein the pneumatic tires are provided with asymmetrical tread patterns including circumferential grooves and axial grooves, and it is specified which tire sidewall should be outside when the tire is installed on the car. The widths of the circumferential grooves are defined in relation to each other. However, shoulder axial grooves, which are disposed in an outboard tread edge side of the tread, are taken into lass consideration and leave room for improvement in the drainage performance.

SUMMARY OF THE INVENTION

It is therefore, an object of the present invention to provide a pneumatic tire which can achieve good steering stability and drainage.

According to one aspect of the present invention, a pneumatic tire comprises a tread portion between an inboard tread edge and an outboard tread edge, and the tread portion is provided with main grooves extending continuously in the tire circumferential direction to axially divide the tread portion into land portions, wherein
the main grooves include an inboard shoulder main groove closest to the inboard tread edge, an outboard shoulder main groove closest to the outboard tread edge, an inboard crown main groove between the inboard shoulder main groove and the tire equator, and an outboard crown main groove between the outboard shoulder main groove and the tire equator,
the outboard shoulder main groove has a width smallest in the main grooves,
the tread portion is provided with axial grooves including outboard shoulder axial grooves extending toward the axially inside from the outboard tread edge, and first outboard middle axial grooves extending toward the axially inside from the outboard shoulder main groove to terminate without being connected to the outboard crown main groove, and
the outboard shoulder axial grooves include first outboard shoulder axial grooves whose axially inner ends are connected to the outboard shoulder main groove, and second outboard shoulder axial grooves whose axially inner ends terminate without being connected to the outboard shoulder main groove,
the first outboard shoulder axial grooves are aligned with the first outboard middle axial grooves, respectively, through the outboard shoulder main groove.

Further, the pneumatic tire according to the present invention may include the following features:
(1) the first outboard shoulder axial grooves and the second outboard shoulder axial grooves are alternately arranged in the tire circumferential direction;
(2) the axial grooves further include a second outboard middle axial groove which is disposed between every two of the circumferentially adjacent first outboard middle axial grooves, and which extends toward the axially outside from the outboard crown main groove to terminate without being connected to the outboard shoulder main groove;
(3) the edges of all of the axial grooves are chamfered;
(4) the land portion defined between the outboard crown main groove and the inboard crown main groove is formed as a circumferentially continuous center rib not provided with a sipe and a groove;
(5) the inboard crown main groove or the outboard crown main groove has a width which is largest in the main grooves and which is at least 2 times the width of the outboard shoulder main groove;
(6) the edges of all of the main grooves are chamfered;
(7) each of the outboard shoulder axial grooves is a bent groove comprising
an outside part extending axially inwardly from the outboard tread edge in substantially parallel with the tire axial direction, and
an inside part inclined with respect to the tire axial direction;
(8) each of the first outboard middle axial grooves has an axial length of from 40% to 60% of the axial width of an outboard middle land portion defined between the outboard shoulder main groove and the outboard crown main groove;
(9) each of the second outboard middle axial grooves has an axial length of from 40% to 60% of the axial width of an outboard middle land portion defined between the outboard shoulder main groove and the outboard crown main groove;
(10) the first outboard middle axial grooves have an axial length L3 and the second outboard middle axial grooves have an axial length L4, and the sum of the axial lengths L3 and L4 is in a range of from 95% to 105% of the axial width Wmo of an outboard middle land portion defined between the outboard shoulder main groove and the outboard crown main groove;
(11) each of the first outboard shoulder axial grooves is provided adjacently to the inner end thereof with a shallow part.

According to another aspect of the present invention, a pneumatic tire comprises a tread portion between an inboard tread edge and an outboard tread edge, and the tread portion is provided with main grooves extending continuously in the tire circumferential direction to axially divide the tread portion into land portions,
the main grooves include an inboard shoulder main groove closest to the inboard tread edge, an outboard shoulder main groove closest to the outboard tread edge, an inboard crown main groove between the inboard shoulder main groove and the tire equator, and an outboard crown main groove between the outboard shoulder main groove and the tire equator,
the tread portion is provided with axial grooves including outboard shoulder axial grooves extending toward the axially inside from the outboard tread edge, and second outboard middle axial grooves extending toward the axially outside from the outboard crown main groove to terminate without being connected to the outboard shoulder main groove, and
the outboard shoulder axial grooves include first outboard shoulder axial grooves whose axially inner ends are connected to the outboard shoulder main groove, and second outboard shoulder axial grooves whose axially inner ends terminate without being connected to the outboard shoulder main groove.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The inboard tread edge Tei and outboard tread edge Teo are the axial outermost edges of the ground contacting patch which occurs under the normally inflated loaded condition when the camber angle of the tire is zero.

The tread width TW is the width measured under the normally inflated unloaded condition, as the axial distance between the inboard and outboard tread edges determined as above.

DESCRIPTION OF THE PREFERRED EMBODIMENT

An embodiment of the present invention will now be described in detail in conjunction with the accompanying drawings.

According to the present invention, pneumatic tire 1 is provided in the tread portion 2 with a tread pattern of left-right asymmetry (asymmetry about the tire equator).

Accordingly, the mounting position of the tire 1 in relation to a vehicle (which side is inside and which side is outside) is specified.

Thus, the tread portion has an outboard tread edge Teo to be positioned away from the center of the vehicle body and an inboard tread edge Tei to be positioned close to the center of the vehicle body.

For example, the sidewall portion to be located on outside when installed on the vehicle is provided with an indication such as "outside", and the sidewall portion to be located on inside is provided with an indication such as "inside".

According thereto, in this application, the terms "outboard" and "inboard" are used toward the outboard tread edge Teo and inboard tread edge Tei, respectively, to refer relative positions in the tire axial direction.

The terms "axially inner", "axially inward" and the like are used toward the tire equator, and the terms "axially outer", "axially outward" and the like are used toward the adjacent tread edge in order to refer relative positions in the tire axial direction.

Figure 1:
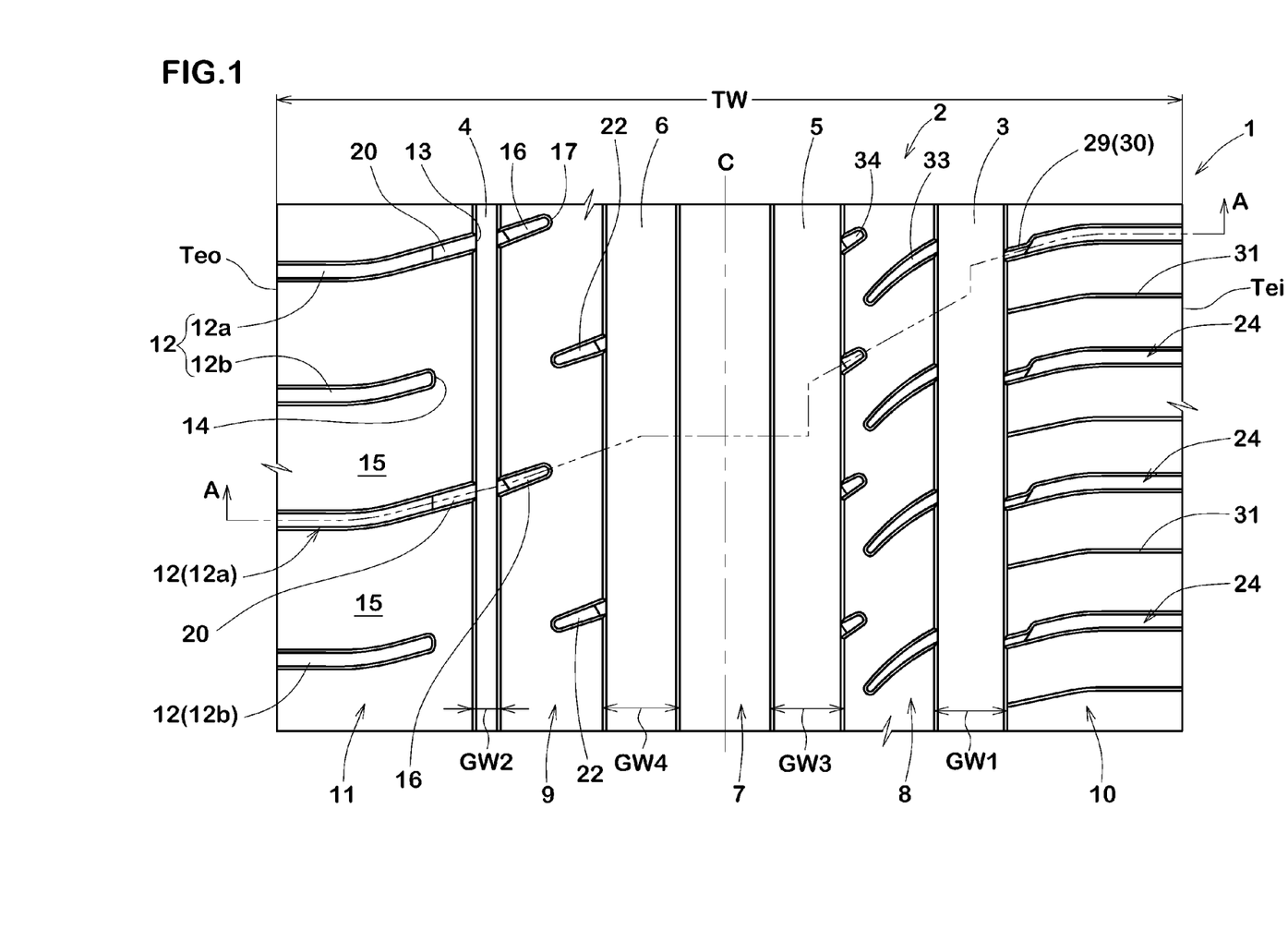
FIG. 1 is a developed partial plan view of a pneumatic tire as an embodiment of the present invention showing an example of the tread pattern.
Figure 2:
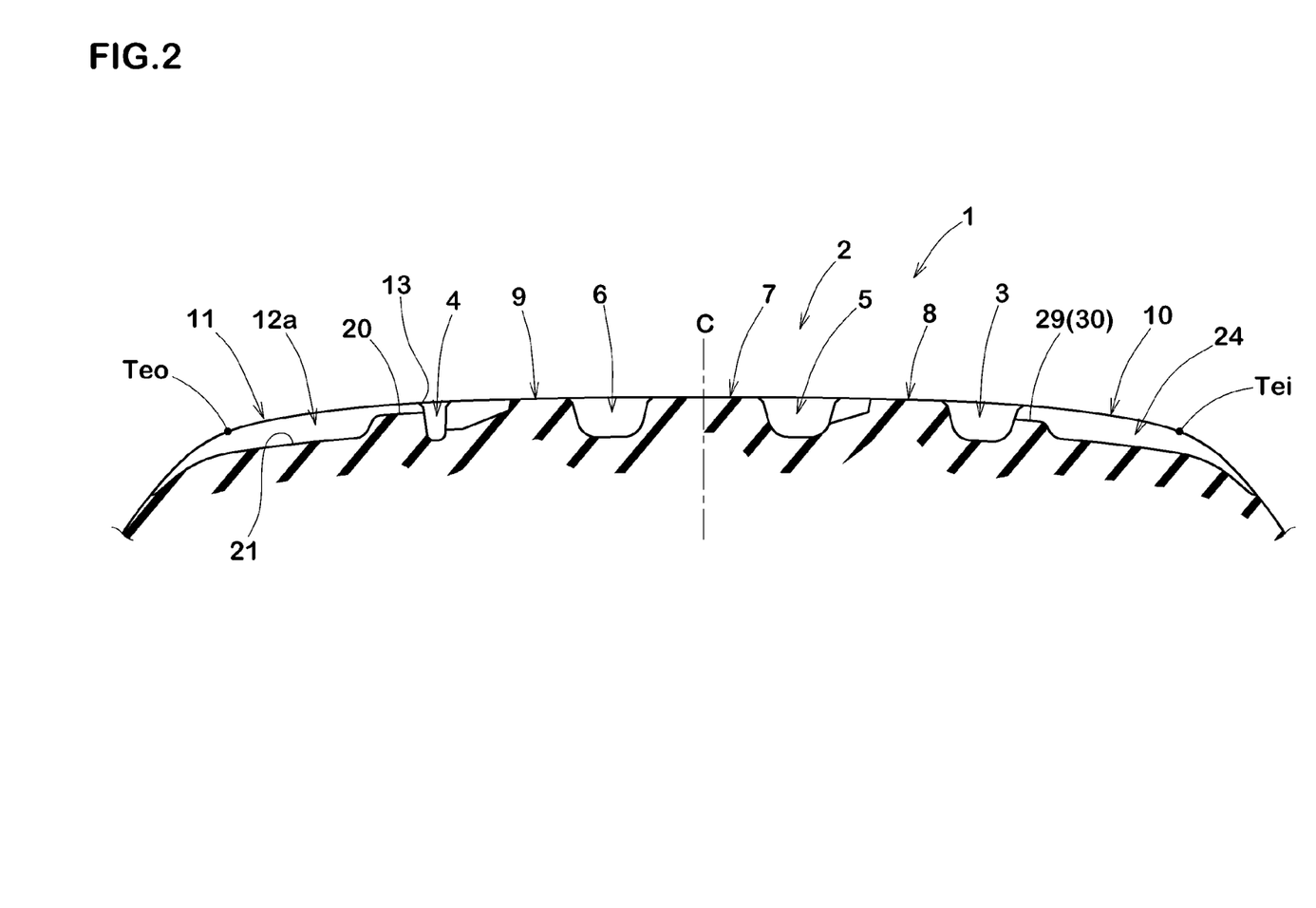
FIG. 2 is a cross sectional view of the tread portion thereof taken along line A-A FIG. 1.

In this embodiment shown in FIG. 1 and FIG. 2, the pneumatic tire 1 is designed as a radial tire for passenger cars.

The tread portion 2 is provided between the inboard tread edge Tei and the outboard tread edge Teo with a plurality of main grooves 3-6 extending continuously in the tire circumferential direction so as to axially divide the tread portion 2 into a plurality of land portions.

The main grooves 3-6 includes:
an inboard shoulder main groove 3 axially outermost toward the inboard tread edge Tei;
an outboard shoulder main groove 4 axially outermost toward the outboard tread edge Teo;
an inboard crown main groove 5 between the inboard shoulder main groove 3 and the tire equator C; and
an outboard crown main groove 6 between the outboard shoulder main groove 4 and the tire equator C.

One or more of the main grooves 3-6 may be formed as a zigzag groove. But, in this embodiment, each of the main grooves 3-6 is formed as a straight groove extending parallel with the tire circumferential direction in order to effectively lead the water existing between the tire and the road surface backwardly during running.

The widths of the main grooves 3-6 are set in a range of not less than 2.5%, more preferably not less than 3%, more preferably not less than 4% of the tread width TW for example in order to secure necessary drainage performance.

It is however preferable that the widths of the main grooves 3-6 are not more than 11.5%, more preferably not more than 10%, more preferably not more than 9% of the tread width TW for example, in order to secure good steering stability by maintaining the proportion of the land portions to the tread portion 3.

For the same reason, the depths of the main grooves 3-6 are preferably set in a range of not less than 6 mm, more preferably not less than 7 mm.

Preferably, the width GW2 of the outboard shoulder main groove 4 is smallest in the main grooves 3-6.

This relatively increases the land portion area (ground contacting area) of the tread portion 2 in an outboard part and helps to improve the steering stability.

Further, by providing the outboard shoulder main groove 4 with the smallest width GW2, it is possible to provide a silent tire.

Preferably, the width GW3 of the inboard crown main groove 5 or the width GW4 of the outboard crown main groove 5 is set to be largest in the main grooves 3-6, and such largest width is preferably set in a range of not less than 7% of the tread width TW. In this embodiment, the largest width GW3 or GW4 is in a range of from 2 to 3 times the width GW2 of the outboard shoulder main groove 4. Thereby, drainage in the vicinity of the tire equator C can be remarkably improved.

In the tread portion 2 in this embodiment, the widths of the main grooves are as follows: GW2<GW1=GW4=GW3.

By the main grooves 3-6, the tread portion 2 is axially divided into five land portions: a center land portion 7 between the main grooves 5 and 6; an inboard middle land portion 8 between the main grooves 5 and 3; an outboard middle land portion 9 between the main grooves 6 and 4; an inboard shoulder land portion 10 between the main groove 3 and the inboard tread edge Tei; and an outboard shoulder land portion 11 between the main groove 4 and the outboard tread edge Teo.

In this embodiment, the main grooves 3-6 are arranged so that the center land portion 7, the inboard middle land portion 8 and the outboard middle land portion 9 have almost same axial widths. The difference between the axial widths of the land portions 7-9 are preferably not more than 5 mm.

The axial width of the inboard shoulder land portion 10 and the axial width of the outboard shoulder land portion 11 are set to be more than the axial width of each land portion 7-9 in order to increase the lateral stiffness (rigidity) of the shoulder land portions 10 and 11 in order to improve the steering stability.

Preferably, the main grooves 3-6 are, as shown in FIG. 2, chamfered by oblique planes extending between the groove sidewalls and the tread surface in order to prevent uneven edge wear.

The tread portion 2 is further provided with a plurality of axial grooves extending in directions intersecting the main grooves 3-6.

The axial grooves includes a plurality of outboard shoulder axial grooves 12 extending toward the axially inside from the outboard tread edge Teo in order that water existing between the tread portion 2 and the road surface is discharged toward the outside from the outboard tread edge Teo.

The outboard shoulder axial grooves 12 include first outboard shoulder axial grooves 12a and second outboard shoulder axial grooves 12b.

The first outboard shoulder axial groove 12a has an axially inner end 13 connected or opened to the outboard shoulder main groove 4 so as to lead the water in the main groove 4 toward the outboard tread edge Teo.

In contrast, the second outboard shoulder axial grooves 12b has an axially inner end 14 terminating within the outboard shoulder land portion 11, without being connected to the outboard shoulder main groove 4, so that the outboard shoulder land portion 11 maintains its rigidity.

In this embodiment, the first outboard shoulder axial grooves 12a and the second outboard shoulder axial grooves 12b are arranged alternately in the tire circumferential direction in order to achieve drainage and lateral stiffness (or rigidity) in the outboard shoulder land portion 11.

By the first shoulder axial grooves 12a, the outboard shoulder land portion 11 is circumferentially divided into a plurality of outboard shoulder blocks 15 having a configuration relatively long in the tire circumferential direction.

As a result, the tread portion 2 in this example is provided with higher rigidity in an outboard tread edge Teo side, while maintaining drainage. Accordingly, in the pneumatic tire 1 in this embodiment, if the center of the ground contacting patch shifts toward the outboard tread edge Teo during cornering, deformation of the tread portion 2 is inhibited. Thereby, a large cornering force is generated, and the tire can exerts good steering stability.

For this reason, it is preferable that the outboard shoulder block 15 is not provided with any void of tread rubber such as groove and sipe inclusive of cut.

Figure 3:
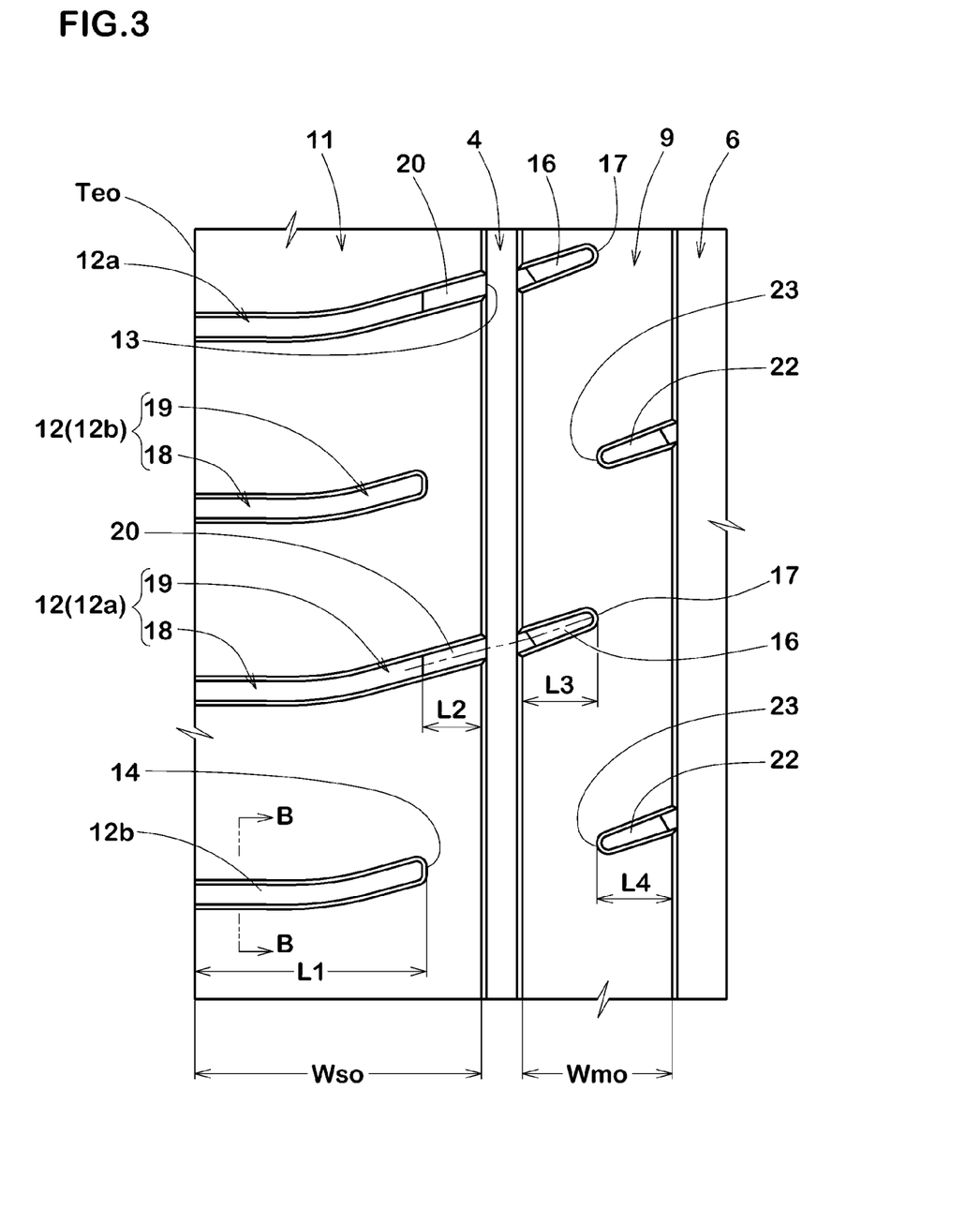
FIG. 3 is a closeup of FIG. 1 showing the vicinity of the outboard tread edge.

As shown in FIG. 3, the second outboard shoulder axial grooves 12b have an axial length L1 which is not less than 50%, preferably not less than 60%, but preferably not more than 90%, more preferably not more than 80% of the axial width Wso of the outboard shoulder land portion 11 in order to provide sufficient lateral stiffness or rigidity while achieving good drainage.

The outboard shoulder axial grooves 12 is for example formed as a bent groove comprising an axially outside part 18 extending from the outboard tread edge Teo in substantially parallel with the tire axial direction, and an axially inside part 19 inclined with respect to the tire axial direction. Each of the outside part 18 and the inside part 19 extends straight.

Preferably, the inside part 19 has an angle in a range of from 10 to 30 degrees with respect to the tire axial direction in order to improve drainage, and the outside part 18 has an angle of not more than 5 degrees with respect to the tire axial direction in order to maintain the lateral stiffness (rigidity) of an axially outer region of the outboard shoulder land portion 11. Thereby, the tire 1 in this embodiment can be further improved in the drainage and steering stability.

As shown in FIG. 2 and FIG. 3, the first outboard shoulder axial groove 12a may be provided in its axially inner end 13 side with a shallow part 20 rising from the groove bottom and having a certain axial length.

On the axially outside of the shallow part 20, a deep part 21 having the maximum depth of the first outboard shoulder axial grooves 12a is formed so as to continue to the outboard tread edge.

Such shallow part 20 increases the rigidity in the vicinity of the junction of the first outboard shoulder axial groove 12a with the outboard shoulder main groove 4, while maintaining drainage, and thereby helps to further improve the steering stability.

In order to effectively derive the above function, the groove depth of the shallow part 20 is set in a range of not more than 50%, preferably not more than 40%, but preferably not less than 10%, more preferably not less than 15% of the maximum groove depth of the deep part 21.

The axial length L2 of the shallow part 20 is preferably set in a range of not less than 10%, more preferably not less than 20%, but not more than 40%, more preferably not more than 30% of the width Wso of the outboard shoulder land portion 11.

Most preferably, the sum L1+L2 of the length L2 of the shallow part 20 and the length L1 of the second outboard shoulder axial grooves 12b is set to be substantially same as the width Wso of the outboard shoulder land portion 11, namely, in a range of from 95% to 105% of the width Wso.

Thereby, the drainage and the steering stability can be further improved.

In contrast, the second outboard shoulder axial grooves 12b are not provided with a shallow part such as the shallow part 20. Essentially, the entirety of the second outboard shoulder axial groove 12b has a constant depth same as that of the deep part 21 of the first outboard shoulder axial grooves 12a. Thereby, the second outboard shoulder axial grooves 12b provide sufficient groove volume and can improve the drainage.

As shown in FIG. 1 and FIG. 3, the axial grooves may include first outboard middle axial grooves 16 extending toward the axially inside from the outboard shoulder main groove 4, and second outboard middle axial grooves 22 extending toward the axially outside from the outboard crown main groove 6.

The axially inner end 17 of the first outboard middle axial groove 16 is terminated within the outboard middle land portion 9, without being connected to the outboard crown main groove 6.

The first outboard middle axial grooves 16 are arranged so as to substantially align with the first outboard shoulder axial grooves 12a, respectively, and smoothly continue to the respective first outboard shoulder axial grooves 12a through the outboard shoulder main groove 4.

In this embodiment, the widthwise center line of the axial groove 12a the widthwise center line of the axial groove 16 are aligned with each other as if continued smoothly. Since such groove arrangement forms a draining channel having a long axial component continuous from the axially inner end 17 of the first outboard middle axial groove 16 to the outboard tread edge Teo, the drainage is further improved.

Further, high rigidity of the outboard shoulder land portion 11 prevents the first outboard shoulder axial grooves 12a and the second outboard shoulder axial grooves 12b from being deformed during cornering, and provides good drainage owing to those grooves.

The axial outer end 23 of the second outboard middle axial groove 22 is terminated within the outboard middle land portion 9, without being connected to the outboard shoulder main groove 4.

In this embodiment, between every two of the circumferentially adjacent first outboard middle axial grooves 16, one (1) second outboard middle axial groove 22 is disposed. Thereby, the outboard middle land portion 9 is formed as a circumferentially continuously extending rib.

Since the first outboard middle axial grooves 16 and the second outboard middle axial grooves 22 are alternately arranged in the tire circumferential direction, the rigidity of the outboard middle land portion 9 is well balanced between its axially inner and outer regions.

The second outboard middle axial grooves 22 can lead, toward the outboard tread edge Teo, the water existing between a tread crown region and the road surface.

Preferably, the first outboard middle axial grooves 16 and the second outboard middle axial grooves 22 are inclined in the same direction as the inside part 19 of the outboard shoulder axial grooves 12.

More preferably, the angles of the first outboard middle axial grooves 16 and the outside parts 18 are set in a range of from 10 to 30 degrees with respect to the tire axial direction.

Preferably, the axial length L3 of the first outboard middle axial groove 16 and the axial length L4 of the second outboard middle axial groove 22 are set in a range of from 40% to 60% of the axial width Wmo of the outboard middle land portion 9 in order to provide good drainage and sufficient rigidity for the outboard middle land portion 9.

In this embodiment, the sum L3+L4 of the axial lengths L3 and L4 is set to be substantially same as the width Wmo, namely, in a range of from 95% to 105% of the width Wmo.

Figure 4:
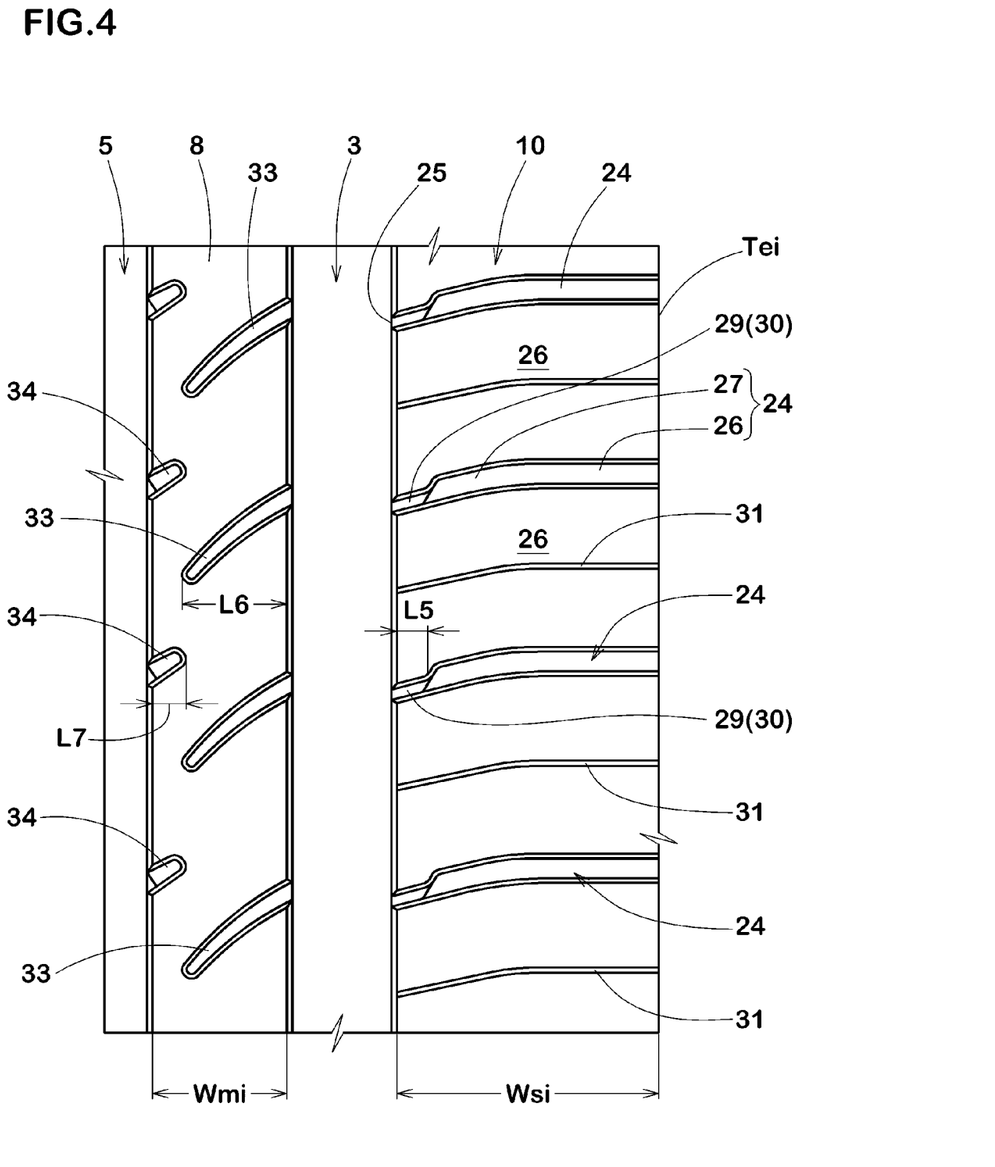
FIG. 4 is a closeup of FIG. 1 showing the vicinity of the inboard tread edge.

In this embodiment, as shown in FIG. 1 and FIG. 4, the axial grooves may include a plurality of inboard shoulder axial grooves 24 extending toward the axially inside from the inboard tread edge Tei.

The inboard shoulder axial grooves 24 each have an axially inner end 25 connected or opened to the inboard shoulder main groove 3.

Accordingly, by the inboard shoulder axial grooves 24, the inboard shoulder land portion 10 is circumferentially divided into inboard shoulder blocks 25 circumferentially arranged in a row.

In this embodiment, the inboard shoulder axial grooves 24 are each formed as a bent groove comprising
an axially outside part 26 extending from the inboard tread edge Tei in substantially parallel with the tire axial direction, and
an axially inside part 27 inclined with respect to the tire axial direction.

Preferably, the angle of the inside part 27 is 10 to 30 degrees with respect to the tire axial direction in order to improve drainage, and
the angle of the outside part 26 is not more than 5 degrees with respect to the tire axial direction in order to maintain the lateral stiffness (rigidity) of an axially outer region of the inboard shoulder land portion 10.

Thereby, the tire 1 in this embodiment can be further improved in the drainage and steering stability.

Preferably, the inboard shoulder axial groove 24 is provided with a narrow width part 29 by partially decreasing the groove width.

The width of the narrow width part 29 is preferably set in a range of from 2 to 4 mm so that, if the inboard shoulder block 26 is subjected by a large shearing force in the tire circumferential direction, the narrow width part 29 is closed, and the circumferentially adjacent inboard shoulder blocks 26 come into contact with each other, thereby the blocks support each other to limit their deformation. This helps to control uneven wear such as heel and toe wear of the inboard shoulder block 26, while maintaining the drainage.

It is preferable that the narrow width parts 29 are disposed in the vicinity of a part of the inboard shoulder land portion 10 which part is subjected to a relatively large ground pressure.

More specifically, the narrow width parts 29 in this embodiment are formed so as to extend axially outwardly from the inboard shoulder main groove 3 by an axial length L5.

The length L5 of the narrow width part 29 is preferably set in a range of from 5 to 30% of the axial width Wsi of the inboard shoulder land portion 10 in order to prevent the uneven wear of the inboard shoulder blocks 26 while maintaining drainage.

Further, it is preferable that, as shown in FIG. 2 and FIG. 4, the narrow width part 29 of the inboard shoulder axial groove 24 is formed as a shallow part 30 where the groove depth is relatively reduced.

The groove depth in the shallow part 30 is preferably set in a range of not more than 50%, more preferably not more than 40%, but preferably not less than 10%, more preferably not less than 15% of the maximum groove depth of the inboard shoulder axial groove 24.

By combining the shallow part 30 and the narrow width part 29 in this way, the above described function can be more effectively exerted.

It is preferable that each of the inboard shoulder blocks 26 is provided with an inboard shoulder sipe 31. The inboard shoulder sipe 31 is disposed in a substantially middle position in the tire circumferential direction, of the inboard shoulder block 26.

Preferably, the inboard shoulder sipe 31 extends across the entire axial width of the inboard shoulder block 26, and both ends thereof are opened at the axial edges of the inboard shoulder block 26.

Such inboard shoulder sipe 31 allows the inboard shoulder block 26 to slightly deform when contacting with the ground, and improves the uneven wear resistance of the block 26.

Incidentally, a sipe is a cut or a fine groove whose width is less than 1.5 mm.

Preferably, the inboard middle land portion 8 is provided with a plurality of first inboard middle axial grooves 33 extending toward the axially inside from the inboard shoulder main groove 3, and a plurality of second inboard middle axial grooves 34 extending toward the axially outside from the inboard crown main groove 5.

Each of the first inboard middle axial grooves 33 and the second inboard middle axial grooves 34 is terminated within the land portion 8, without extending across the entire axial width of the inboard middle land portion 8. Thereby, the inboard middle land portion 8 is formed as a circumferentially continuous rib.

The first inboard middle axial grooves 33 and the second inboard middle axial grooves 34 are arranged alternately in the tire circumferential direction. Thereby, the rigidity of the inboard middle land portion 8 is well balanced between its axially inner and outer regions.

In this example, the first inboard middle axial grooves 33 are inclined with respect to the tire axial direction (in FIG. 4, upward to the right).

Preferably, the first inboard middle axial grooves 33 are inclined in the same direction as the inside parts 27 of the inboard shoulder axial grooves 24.

In general, the inboard middle land portion 8 less contributes to the steering stability in comparison with other land portions. Therefore, it is preferable that the inboard middle land portion 8 is improved toward the drainage rather than the steering stability.

For this reason, it is preferable that each of the first inboard middle axial grooves 33 is provided with a part whose angle with respect to the tire axial direction is larger than its other part and largest in all other axial grooves so that the direction of water flow in this part becomes closer to the tire rotation direction, and thereby the resistance to water flow is reduced.

Preferably, the angle of the first inboard middle axial groove 33 with respect to the tire axial direction is set in a range of not less than 25 degrees, more preferably not less than 35 degrees, but not more than 70 degrees, more preferably not more than 60 degrees.

It is especially preferable that the axial length L6 of the first inboard middle axial groove 33 is set in a range of 60% to 85% of the axial width Wmi of the inboard middle land portion 8 in order to effectively increase drainage while minimizing deterioration in the steering stability.

In this embodiment, the second inboard middle axial grooves 34 are inclined in the same direction as the first inboard middle axial grooves 33.

During cornering, there is a possibility that an axially inner region of the inboard middle land portion 8 is subjected to a larger ground pressure, therefore, in order to increase the lateral stiffness (rigidity) of this region, the angle of the second inboard middle axial groove 34 with respect to the tire axial direction is preferably set to be not more than the angle of the first inboard middle axial groove 33 with respect to the tire axial direction.

For similar reasons, it is preferable that the axial length L7 of the second inboard middle axial groove 34 is set to be less than the axial length L6 of the first inboard middle axial groove 33.

It is preferable that the length L7 of the second inboard middle axial groove 34 is set to be smallest in all of the axial grooves.

In this embodiment, the sum (L6+L7) of the length L6 of the first inboard middle axial groove 33 and the length L7 of the second inboard middle axial groove 34 is substantially equal to the width Wmi of the inboard middle land portion 8.

The center land portion 7 is formed as a rib which is not provided with any void of tread rubber such as groove and sipe inclusive of cut. Thereby, the tread central portion region is provided with high circumferential rigidity, and the tire is improved in the stability during straight running.

Figure 5:
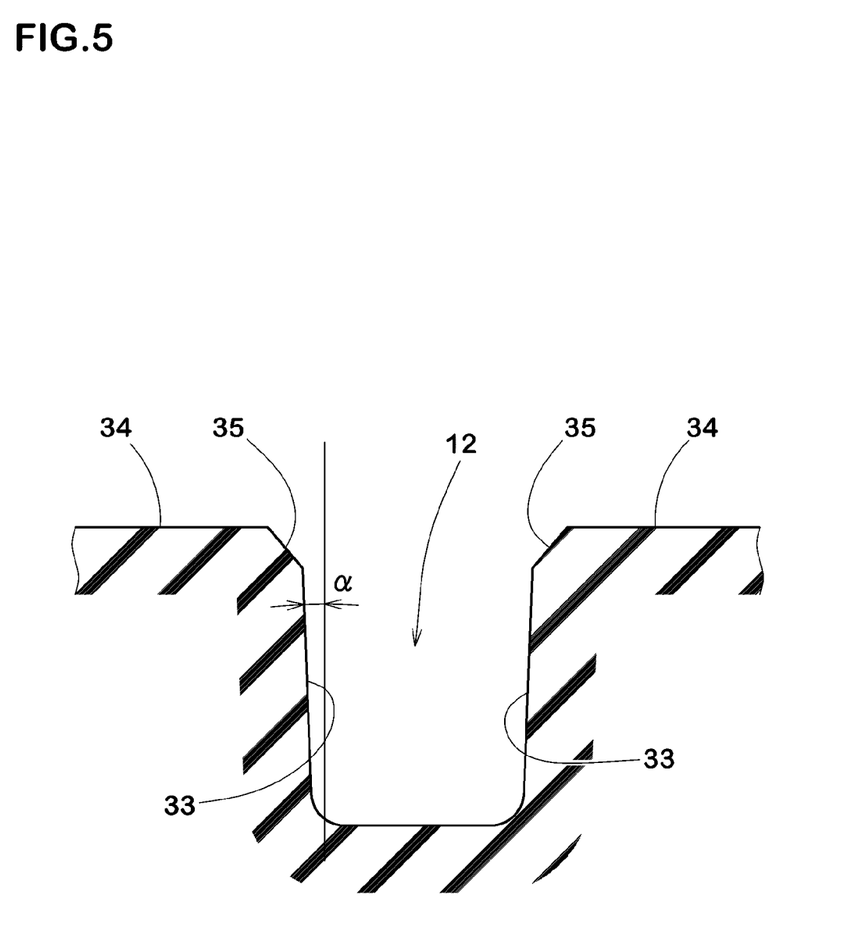
FIG. 5 is a cross sectional view of a groove taken along line B-B in FIG. 3.

In this embodiment, as shown in the figures (plan views) by using double line, the edges of all of the axial grooves are chamfered. As a representative example of such chamfered axial grooves, the cross sectional view of the outboard shoulder axial groove 12 is shown in FIG. 5. As shown, the chamfer 35 in each axial groove is an oblique plane extending between the groove sidewall and the tread surface.

Such chamfers 35 of the axial grooves can improve edge wear or uneven wear of the tread portion.

It is preferable that the angle a of the groove sidewalls with respect to the tire radial direction of at least the outboard shoulder axial grooves 12 is not more than 5 degrees, more preferably not more than 4 degrees in order to further increase the steering stability.

Comparison Tests

Radial tires (run flat tire) of size 245/45R18 for passenger cars were experimentally manufactured and tested for the steering stability and wet performance.

Embodiment tire Ex. had the tread pattern shown in FIG. 1.

Figure 6:
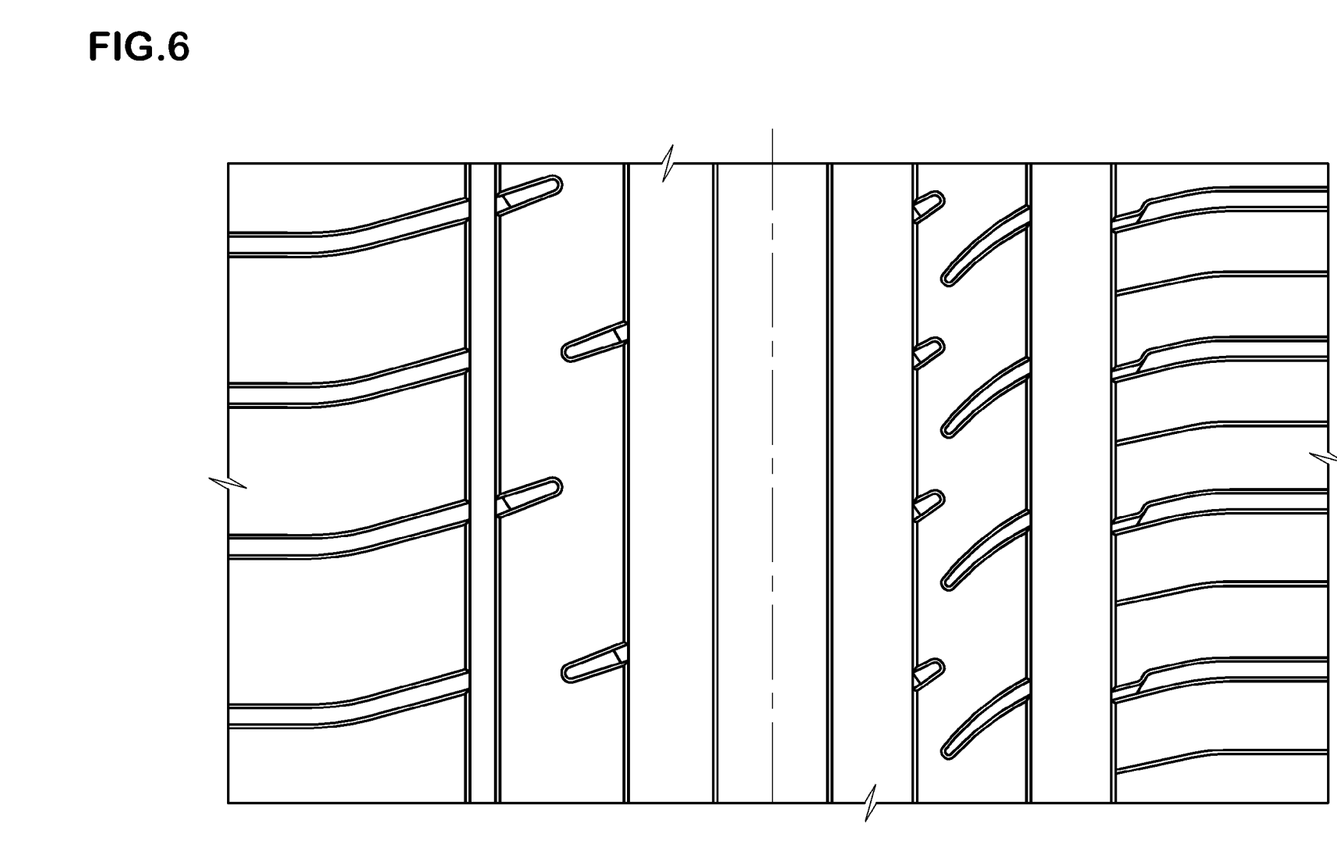
FIGS. 6, 7 and 8 are developed partial views of pneumatic tires used as comparative examples in the undermentioned comparison tests.

Comparative example tire Ref. 1 had a tread pattern shown in FIG. 6 in which the second outboard shoulder axial grooves were extended to the outboard shoulder main groove, namely, all of the outboard shoulder axial grooves were formed as the first outboard shoulder axial grooves.

Figure 7:
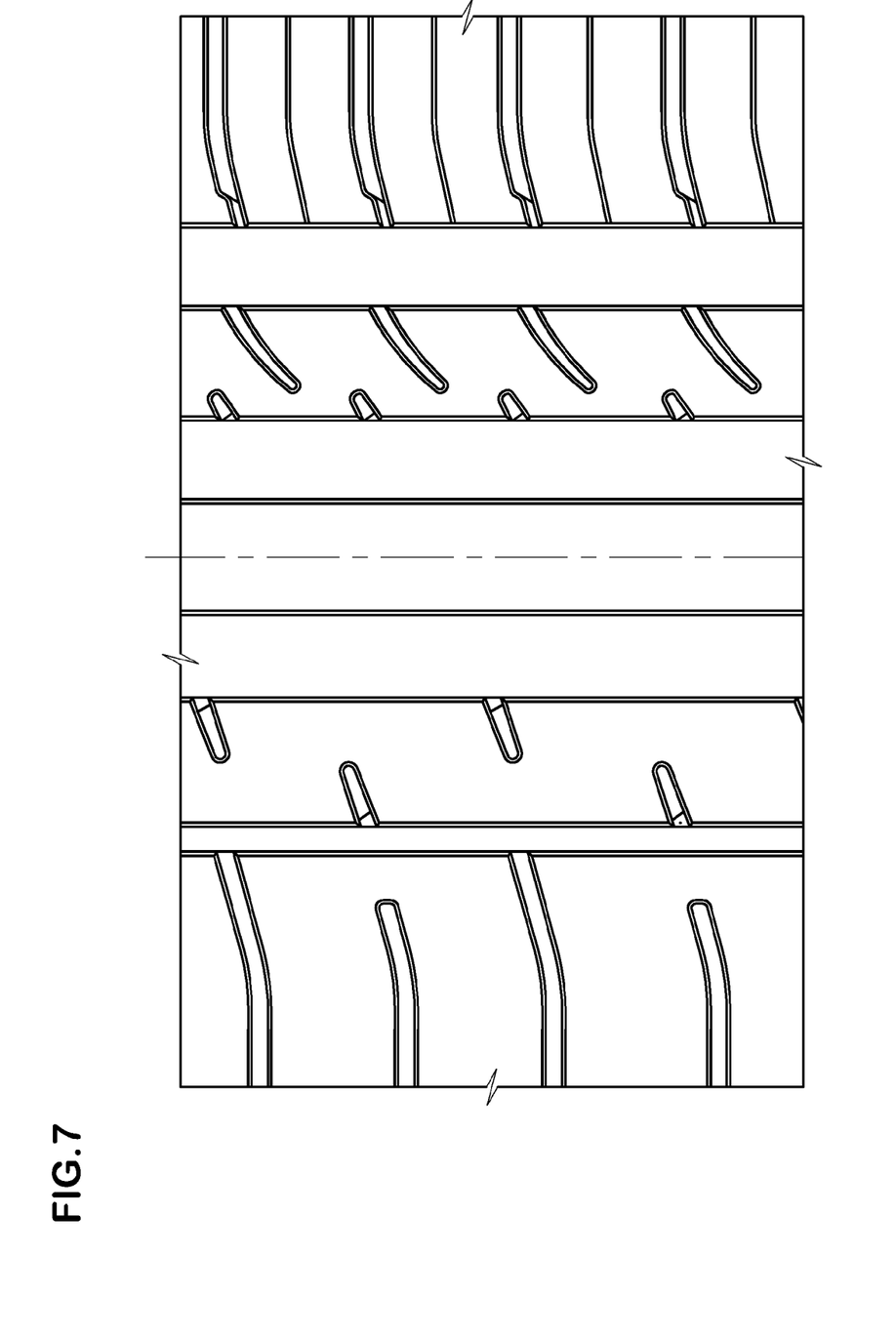

Comparative example tire Ref. 2 had a tread pattern shown in FIG. 7 in which the first outboard middle axial grooves were not aligned with the first outboard shoulder axial grooves.

Figure 8:
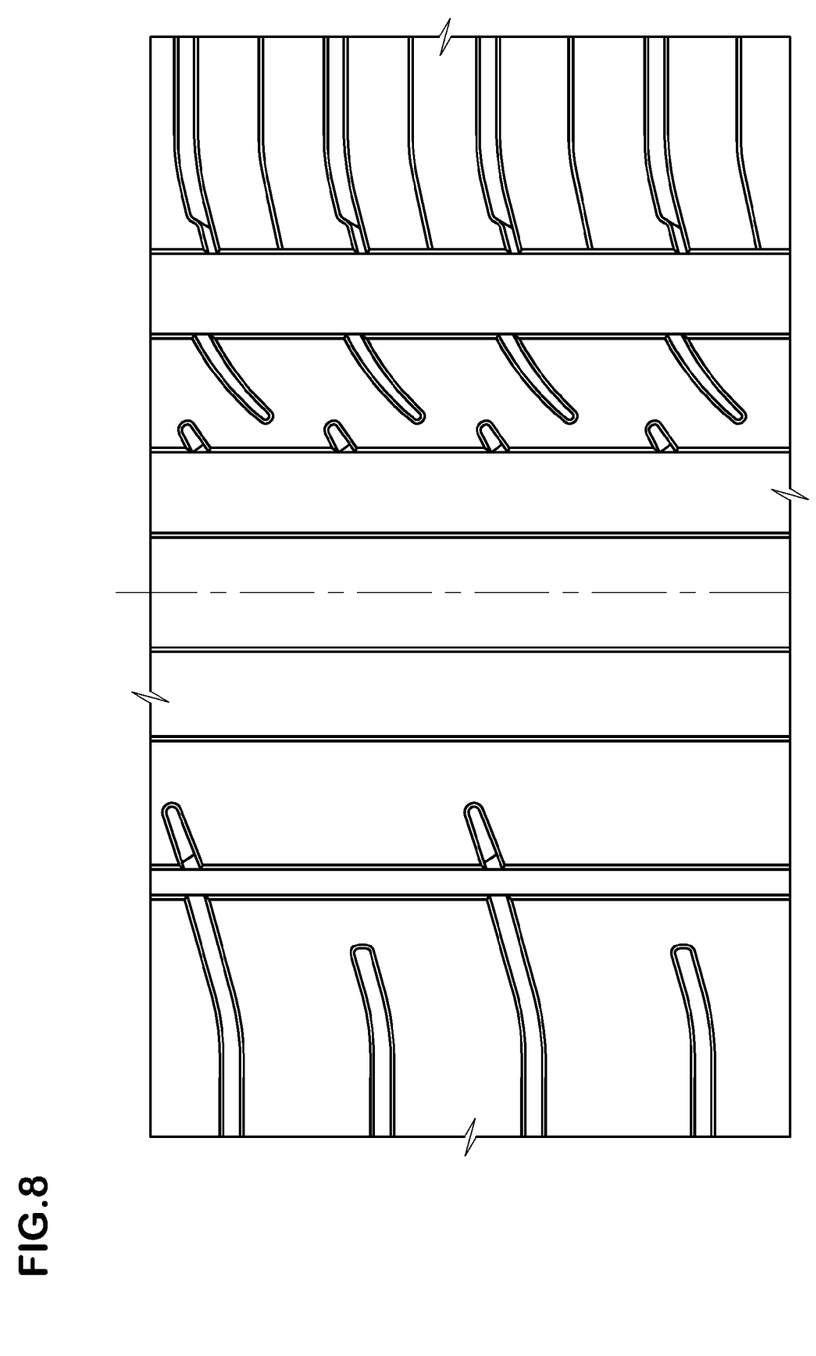

Comparative example tire Ref. 3 had a tread pattern shown in FIG. 8 in which the second outboard middle axial grooves 22 were omitted.

<Steering Stability Test>

A 3500 cc passenger car provided on all of the four wheels with same test tires was run on a dry asphalt road in a test course under a tire pressure of 230 kPa, and the test driver evaluated steering stability based on the handle response, rigidity, grip and the like.

The results are indicated in table 1 by an index based on Comparative example tire Ref. 1 being 100, wherein the larger the index number, the better the steering stability.

<Wet Performance Test>

The test car was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on Ref. 1 being 100, wherein the larger the index number, the better the wet performance.

TABLE 1

| Tire | Ref. 1 | Ref. 2 | Ref. 3 | Ex. |
|---|---|---|---|---|
| Steering stability | 100 | 103 | 105 | 103 |
| Wet performance | 100 | 97 | 95 | 99 | while description has been made of preferable embodiments of the present invention, the illustrated embodiments should not be construed as to limit the scope of the present invention; various modifications are possible without departing from the scope of the present invention.

REFERENCE SIGNS LIST 1 pneumatic tire
2 tread portion
3 inboard shoulder main groove
4 outboard shoulder main groove
5 inboard crown main groove
6 outboard crown main groove
7 center land portion
8 inboard middle land portion
9 outboard middle land portion
10 inboard shoulder land portion
11 outboard shoulder land portion
12 outboard shoulder axial groove
12a first outboard shoulder axial groove
12b second outboard shoulder axial groove
16 first outboard middle axial groove
22 second outboard middle axial groove
Tei inboard tread edge
Teo outboard tread edge

The invention claimed is:

1. A pneumatic tire comprising a tread portion between an inboard tread edge and an outboard tread edge,
   the tread portion provided with main grooves extending continuously in the tire circumferential direction to axially divide the tread portion into land portions,
   the main grooves including an inboard shoulder main groove closest to the inboard tread edge, an outboard shoulder main groove closest to the outboard tread edge, an inboard crown main groove between the inboard shoulder main groove and the tire equator, and an outboard crown main groove between the outboard shoulder main groove and the tire equator,
   the outboard shoulder main groove having a width smallest in the main grooves,
   the tread portion provided with axial grooves including
     outboard shoulder axial grooves extending toward the axially inside from the outboard tread edge, and
     first outboard middle axial grooves extending toward the axially inside from the outboard shoulder main groove to terminate without being connected to the outboard crown main groove, and
   the outboard shoulder axial grooves including
     first outboard shoulder axial grooves whose axially inner ends are connected to the outboard shoulder main groove, and
     second outboard shoulder axial grooves whose axially inner ends terminate without being connected to the outboard shoulder main groove, wherein:
   the first outboard shoulder axial grooves are aligned with the first outboard middle axial grooves, respectively, through the outboard shoulder main groove, and
   the axial grooves further include a second outboard middle axial groove which is disposed between every two of the circumferentially adjacent first outboard middle axial grooves, and which extends toward the axially outside from the outboard crown main groove to terminate without being connected to the outboard shoulder main groove.

2. The pneumatic tire according to claim 1, wherein the first outboard shoulder axial grooves and the second outboard shoulder axial grooves are alternately arranged in the tire circumferential direction.

3. The pneumatic tire according to claim 1, wherein the inboard crown main groove or the outboard crown main groove has a width which is largest in the main grooves and which is at least 2 times the width of the outboard shoulder main groove.

4. The pneumatic tire according to claim 1, wherein each of the second outboard middle axial grooves has an axial length of from 40% to 60% of the axial width of an outboard middle land portion defined between the outboard shoulder main groove and the outboard crown main groove.

5. The pneumatic tire according to claim 1, wherein the first outboard middle axial grooves have an axial length L3 and the second outboard middle axial grooves have an axial length L4, and the sum of the axial lengths L3 and L4 is in a range of from 95% to 105% of the axial width Wmo of an outboard middle land portion defined between the outboard shoulder main groove and the outboard crown main groove.

6. The pneumatic tire according to claim 2, wherein the edges of all of the axial grooves are chamfered.

7. The pneumatic tire according to claim 2, wherein the land portion defined between the outboard crown main groove and the inboard crown main groove is formed as a circumferentially continuous center rib not provided with a sipe and a groove.

8. The pneumatic tire according to claim 2, wherein the inboard crown main groove or the outboard crown main groove has a width which is largest in the main grooves and which is at least 2 times the width of the outboard shoulder main groove.

9. A pneumatic tire comprising a tread portion between an inboard tread edge and an outboard tread edge,
   the tread portion provided with main grooves extending continuously in the tire circumferential direction to axially divide the tread portion into land portions,
   the main grooves including an inboard shoulder main groove closest to the inboard tread edge, an outboard shoulder main groove closest to the outboard tread edge, an inboard crown main groove between the inboard shoulder main groove and the tire equator, and an outboard crown main groove between the outboard shoulder main groove and the tire equator,
   the outboard shoulder main groove having a width smallest in the main grooves,
   the tread portion provided with axial grooves including
     outboard shoulder axial grooves extending toward the axially inside from the outboard tread edge, and
     first outboard middle axial grooves extending toward the axially inside from the outboard shoulder main groove to terminate without being connected to the outboard crown main groove, and the outboard shoulder axial grooves including
first outboard shoulder axial grooves whose axially inner ends are connected to the outboard shoulder main groove, and
second outboard shoulder axial grooves whose axially inner ends terminate without being connected to the outboard shoulder main groove,
wherein:
the first outboard shoulder axial grooves are aligned with the first outboard middle axial grooves, respectively, through the outboard shoulder main groove, and
the edges of all of the axial grooves are chamfered.

10. The pneumatic tire according to claim 9, wherein the land portion defined between the outboard crown main groove and the inboard crown main groove is formed as a circumferentially continuous center rib not provided with a sipe and a groove.

11. A pneumatic tire comprising a tread portion between an inboard tread edge and an outboard tread edge,
the tread portion provided with main grooves extending continuously in the tire circumferential direction to axially divide the tread portion into land portions,
the main grooves including an inboard shoulder main groove closest to the inboard tread edge, an outboard shoulder main groove closest to the outboard tread edge, an inboard crown main groove between the inboard shoulder main groove and the tire equator, and an outboard crown main groove between the outboard shoulder main groove and the tire equator,
the outboard shoulder main groove having a width smallest in the main grooves,
the tread portion provided with axial grooves including
outboard shoulder axial grooves extending toward the axially inside from the outboard tread edge, and
first outboard middle axial grooves extending toward the axially inside from the outboard shoulder main groove to terminate without being connected to the outboard crown main groove, and
the outboard shoulder axial grooves including
first outboard shoulder axial grooves whose axially inner ends are connected to the outboard shoulder main groove, and
second outboard shoulder axial grooves whose axially inner ends terminate without being connected to the outboard shoulder main groove,
wherein:
the first outboard shoulder axial grooves are aligned with the first outboard middle axial grooves, respectively, through the outboard shoulder main groove, and
the land portion defined between the outboard crown main groove and the inboard crown main groove is formed as a circumferentially continuous center rib not provided with a sipe and a groove.

12. A pneumatic tire comprising a tread portion between an inboard tread edge and an outboard tread edge,
the tread portion provided with main grooves extending continuously in the tire circumferential direction to axially divide the tread portion into land portions,
the main grooves including an inboard shoulder main groove closest to the inboard tread edge, an outboard shoulder main groove closest to the outboard tread edge, an inboard crown main groove between the inboard shoulder main groove and the tire equator, and an outboard crown main groove between the outboard shoulder main groove and the tire equator,
the outboard shoulder main groove having a width smallest in the main grooves,
the tread portion provided with axial grooves including
outboard shoulder axial grooves extending toward the axially inside from the outboard tread edge, and
first outboard middle axial grooves extending toward the axially inside from the outboard shoulder main groove to terminate without being connected to the outboard crown main groove, and
the outboard shoulder axial grooves including
first outboard shoulder axial grooves whose axially inner ends are connected to the outboard shoulder main groove, and
second outboard shoulder axial grooves whose axially inner ends terminate without being connected to the outboard shoulder main groove,
wherein:
the first outboard shoulder axial grooves are aligned with the first outboard middle axial grooves, respectively, through the outboard shoulder main groove, and
the edges of all of the main grooves are chamfered.

13. A pneumatic tire comprising a tread portion between an inboard tread edge and an outboard tread edge,
the tread portion provided with main grooves extending continuously in the tire circumferential direction to axially divide the tread portion into land portions,
the main grooves including an inboard shoulder main groove closest to the inboard tread edge, an outboard shoulder main groove closest to the outboard tread edge, an inboard crown main groove between the inboard shoulder main groove and the tire equator, and an outboard crown main groove between the outboard shoulder main groove and the tire equator,
the outboard shoulder main groove having a width smallest in the main grooves,
the tread portion provided with axial grooves including
outboard shoulder axial grooves extending toward the axially inside from the outboard tread edge, and
first outboard middle axial grooves extending toward the axially inside from the outboard shoulder main groove to terminate without being connected to the outboard crown main groove, and
the outboard shoulder axial grooves including
first outboard shoulder axial grooves whose axially inner ends are connected to the outboard shoulder main groove, and
second outboard shoulder axial grooves whose axially inner ends terminate without being connected to the outboard shoulder main groove,
wherein:
the first outboard shoulder axial grooves are aligned with the first outboard middle axial grooves, respectively, through the outboard shoulder main groove, and
each of the outboard shoulder axial grooves is a bent groove comprising an outside part extending axially inwardly from the outboard tread edge in substantially parallel with the tire axial direction, and an inside part inclined with respect to the tire axial direction.

14. A pneumatic tire comprising a tread portion between an inboard tread edge and an outboard tread edge,
the tread portion provided with main grooves extending continuously in the tire circumferential direction to axially divide the tread portion into land portions,
the main grooves including an inboard shoulder main groove closest to the inboard tread edge, an outboard shoulder main groove closest to the outboard tread edge, an inboard crown main groove between the inboard shoulder main groove and the tire equator, and an outboard crown main groove between the outboard shoulder main groove and the tire equator, the outboard shoulder main groove having a width smallest in the main grooves, the tread portion provided with axial grooves including
outboard shoulder axial grooves extending toward the axially inside from the outboard tread edge, and
first outboard middle axial grooves extending toward the axially inside from the outboard shoulder main groove to terminate without being connected to the outboard crown main groove, and the outboard shoulder axial grooves including
first outboard shoulder axial grooves whose axially inner ends are connected to the outboard shoulder main groove, and
second outboard shoulder axial grooves whose axially inner ends terminate without being connected to the outboard shoulder main groove, wherein:

the first outboard shoulder axial grooves are aligned with the first outboard middle axial grooves, respectively, through the outboard shoulder main groove, and each of the first outboard middle axial grooves has an axial length of from 40% to 60% of the axial width of an outboard middle land portion defined between the outboard shoulder main groove and the outboard crown main groove.

15. A pneumatic tire comprising a tread portion between an inboard tread edge and an outboard tread edge, the tread portion provided with main grooves extending continuously in the tire circumferential direction to axially divide the tread portion into land portions, the main grooves including an inboard shoulder main groove closest to the inboard tread edge, an outboard shoulder main groove closest to the outboard tread edge, an inboard crown main groove between the inboard shoulder main groove and the tire equator, and an outboard crown main groove between the outboard shoulder main groove and the tire equator, the outboard shoulder main groove having a width smallest in the main grooves, the tread portion provided with axial grooves including
outboard shoulder axial grooves extending toward the axially inside from the outboard tread edge, and
first outboard middle axial grooves extending toward the axially inside from the outboard shoulder main groove to terminate without being connected to the outboard crown main groove, and the outboard shoulder axial grooves including
first outboard shoulder axial grooves whose axially inner ends are connected to the outboard shoulder main groove, and
second outboard shoulder axial grooves whose axially inner ends terminate without being connected to the outboard shoulder main groove, wherein:

the first outboard shoulder axial grooves are aligned with the first outboard middle axial grooves, respectively, through the outboard shoulder main groove, and each of the first outboard shoulder axial grooves is provided adjacently to the inner end thereof with a shallow part.

* * * * *